(12) United States Patent
Dejneka et al.

(10) Patent No.: US 9,156,725 B2
(45) Date of Patent: Oct. 13, 2015

(54) DOWN-DRAWABLE CHEMICALLY STRENGTHENED GLASS FOR INFORMATION STORAGE DEVICES

(71) Applicant: Corning Incorporated, Corning, NY (US)

(72) Inventors: Matthew John Dejneka, Corning, NY (US); John Christopher Mauro, Corning, NY (US); Morten Mattrup Smedskjaer, Aalborg (DK)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 13/904,808

(22) Filed: May 29, 2013

(65) Prior Publication Data

US 2014/0356576 A1  Dec. 4, 2014

Related U.S. Application Data

(60) Provisional application No. 61/652,903, filed on May 30, 2012.

(51) Int. Cl.
*G11B 7/24* (2013.01)
*C03C 3/093* (2006.01)
*C03C 3/085* (2006.01)
*C03C 3/087* (2006.01)

(52) U.S. Cl.
CPC ............... *C03C 3/093* (2013.01); *C03C 3/085* (2013.01); *C03C 3/087* (2013.01); *Y10T 428/24355* (2015.01)

(58) Field of Classification Search
CPC ................ C03C 3/83; C03C 3/85; C03C 3/87
See application file for complete search history.

(56) References Cited

U.S. PATENT DOCUMENTS

| | | | |
|---|---|---|---|
| 6,818,576 B2 | 11/2004 | Ikenishi et al. | 501/65 |
| 7,090,937 B2 | 8/2006 | Ikenishi et al. | 428/846.9 |
| 7,595,273 B2 | 9/2009 | Ikenishi et al. | 501/70 |
| 7,601,446 B2 | 10/2009 | Ikenishi et al. | 428/846.9 |
| 7,838,136 B2 | 11/2010 | Nakashima et al. | 428/846.9 |
| 7,964,298 B2 | 6/2011 | Ikenishi et al. | 428/846.9 |
| 7,972,662 B2 | 7/2011 | Ikenishi et al. | 427/553 |
| 8,076,014 B2 | 12/2011 | Tachiwana et al. | 428/846.9 |
| 8,222,170 B2 | 7/2012 | Ikenishi et al. | 501/69 |
| 8,431,498 B2* | 4/2013 | Hsu et al. | 501/5 |
| 8,518,565 B2* | 8/2013 | Kawai | 428/846.9 |
| 8,652,659 B2* | 2/2014 | Kawai | 428/846.9 |
| 8,722,554 B2* | 5/2014 | Comte | 501/68 |
| 2002/0172513 A1* | 11/2002 | Kido et al. | 396/67 |
| 2004/0070120 A1* | 4/2004 | Doehring et al. | 264/653 |
| 2010/0035745 A1 | 2/2010 | Murata | 501/68 |
| 2010/0087307 A1 | 4/2010 | Murata et al. | 501/67 |
| 2012/0264585 A1* | 10/2012 | Ohara et al. | 501/70 |

FOREIGN PATENT DOCUMENTS

| | | | | |
|---|---|---|---|---|
| DE | 10133963 B4 | 12/2006 | | C03C 3/093 |
| JP | 2008115071 A | 5/2008 | | |

* cited by examiner

*Primary Examiner* — Elizabeth Mulvaney
(74) *Attorney, Agent, or Firm* — Timothy M Schaeberle

(57) ABSTRACT

Described herein are various glass compositions, glass articles, and information storage devices that comprise the glass articles as substrates therefor, along with methods for their manufacture and use.

20 Claims, No Drawings

DOWN-DRAWABLE CHEMICALLY STRENGTHENED GLASS FOR INFORMATION STORAGE DEVICES

CROSS-REFERENCE TO RELATED APPLICATIONS

This application claims the benefit of priority under 35 U.S.C. §119 of U.S. Provisional Patent Application Ser. No. 61/952,903, filed on 30 May 2012, the entire contents of which are relied upon and incorporated herein by reference as if fully set forth below.

TECHNICAL FIELD

The present disclosure generally relates to information storage devices. More particularly, the various embodiments described herein relate to glass compositions, information storage device substrates comprising the glass compositions, and information storage devices comprising the substrates, as well as to methods of making and using the glass compositions, substrates, and information storage devices.

BACKGROUND

The miniaturization of information storage devices has been accompanied by increases in storage density, device capacity, and access speed (i.e., read and/or write speeds). Such devices, which include hard disk drives, optical disks, and the like, generally include a substrate on which various coatings or layers (e.g., a lubricant layer, an adhesion promotion layer, a passivation layer, a magnetic material layer, and other like layers) are deposited.

These coated substrates can spin between about 4200 and about 15000 revolutions per minute (rpm) during read and/or write operations, with read/write heads that can be positioned as close as a few nanometers (nm) from the spinning, coated substrate. At these access speeds and head distances, even small defects in the surface of the substrate (and, by extension, the surface of the outermost coating disposed on the substrate) will cause unacceptable errors during operation. In addition, as thinner substrates are implemented in an attempt to reduce the size of the final device, substrate stiffness can affect performance. That is, at such high access speeds, the substrate can undergo out-of-plane deflections, which also will result in unacceptable errors during operation. Thus, in order to continue to achieve further improvements in size and performance, the information storage devices will need substrates that are thinner, more rigid/stiff, and smoother.

Currently, substrates for such devices are formed using aluminum, glass, or ceramics. These materials are subjected to intensive chemical and/or mechanical processing (e.g., acid and/or base cleaning, mechanical grinding, polishing, edge shaping, interior orifice cutting/shaping, and the like) to provide the appropriate thickness and smoothness levels. In addition to being costly, the additional processing steps to which the substrates are exposed have the potential to introduce additional defects and/or reduce the stiffness of the substrate material.

There accordingly remains a need for substrates and substrate materials for information storage devices that have improved stiffness and surface smoothness properties while having a sufficiently low thickness values. It would be particularly advantageous if such substrates and substrate materials could be formed in such a manner that would result in post-fabrication chemical and/or processing steps, if needed, having minimal to no effect on the surface smoothness or stiffness properties thereof. It is to the provision of such technologies that the present disclosure is directed.

BRIEF SUMMARY

Described herein are various glass compositions, glass articles, and information storage devices that comprise the glass articles as substrates therefor, along with methods for their manufacture and use.

One type of glass composition can include $SiO_2$, $Al_2O_3$, $Li_2O$, $Na_2O$, and a divalent metal oxide represented by "MO," wherein M is Mg, Ca, or Zn. This type of glass composition can have a liquidus viscosity of at least about 200 kilopoise and/or a Young's modulus of at least about 80 gigapascals. The glass composition can also have a density of less than or equal to about 2.55 grams per cubic centimeter. In addition, the glass composition can have a specific modulus of at least 30.5 gigapascals*cubic centimeters per gram.

This type of glass composition can, in certain implementations, have the following features: 55 mol %≤$SiO_2$≤82 mol %; 3 mol %≤$Al_2O_3$≤30 mol %; $Na_2O+K_2O+Li_2O$≥10 mol %; 0 mol %≤$B_2O_3$≤5 mol %; 0.5 mol %≤$MgO+CaO+ZnO$≤8 mol %; and 0 mol %≤$ZrO_2+TiO_2+HfO_2+Nb_2O_5+Ta_2O_5+La_2O_3+Y_2O_3$≤5 mol %. In these implementations, it is also possible for the glass composition to include the following feature: $Li_2O$≥5 mol %. In these implementations, the glass composition can further include a fining agent in an amount less than or equal to 0.5 mol %.

Another type of glass composition can have the following features: $SiO_2$≥55 mol %; $Al_2O_3$≥3 mol %; $Li_2O$≥5 mol %; 60 mol %≤$SiO_2+Al_2O_3$≤85 mol %; $Na_2O+K_2O+Li_2O$≥10 mol %; 0.5 mol %≤$MgO+CaO+ZnO$≤8 mol %; and 0 mol %≤$ZrO_2+TiO_2+HfO_2+Nb_2O_5+Ta_2O_5+La_2O_3+Y_2O_3$≤5 mol %. This type of glass can have a liquidus viscosity of at least about 200 kilopoise.

This type of glass composition can have a Young's modulus of at least about 75 gigapascals. It can also have a content of MgO that is greater than a content of CaO. In addition, the ratio of $Li_2O$ to $Na_2O$ can be greater than or equal to 0.7904. Further, the glass composition can be at least substantially free of $ZrO_2$ and/or $TiO_2$. Still further, the glass composition can have a density of less than or equal to 2.55 grams per cubic centimeter and/or a specific modulus of at least 30.5 gigapascals*cubic centimeters per gram.

One type of glass article can be formed from a glass composition that includes the following features: $SiO_2$≥55 mol %; $Al_2O_3$≥3 mol %; $Li_2O$≥5 mol %; 60 mol %≤$SiO_2+Al_2O_3$≤85 mol %; $Na_2O+K_2O+Li_2O$≥10 mol %; 0.5 mol %≤$MgO+CaO+ZnO$≤8 mol %; and 0 mol %≤$ZrO_2+TiO_2+HfO_2+Nb_2O_5+Ta_2O_5+La_2O_3+Y_2O_3$≤5 mol %. The glass composition of this type of glass article can have a liquidus viscosity of at least about 200 kilopoise. The glass composition of this type of glass article can have a Young's modulus of at least about 75 gigapascals.

In certain implementations, the glass article can have a thickness of less than or equal to about 2 millimeters. At least one major surface of the glass article can have a root mean square roughness of less than or equal to 2 nanometers. In addition, at least one major surface of the glass article can have a surface compressive stress of at least about 200 megapascals and a surface compressive layer having a depth of at least about 30 micrometers.

One type of information storage device can include a glass substrate having a thickness of less than or equal to about 2 millimeters. The glass substrate can have at least one major surface that has a root mean square roughness of less than or equal to 2 nanometers, a surface compressive stress of at least about 200 megapascals, and a surface compressive layer having a depth of at least about 30 micrometers. The glass substrate can be formed from a glass composition that includes the following features: $SiO_2 \geq 55$ mol %; $Al_2O_3 \geq 3$ mol %; $Li_2O \geq 5$ mol %; 60 mol % $\leq SiO_2 + Al_2O_3 \leq 85$ mol %; $Na_2O + K_2O + Li_2O \geq 10$ mol %; 0.5 mol % $\leq MgO + CaO + ZnO \leq 8$ mol %; and 0 mol % $\leq ZrO_2 + TiO_2 + HfO_2 + Nb_2O_5 + Ta_2O_5 + La_2O_3 + Y_2O_3 \leq 5$ mol %. The glass composition of this type of glass substrate can have a liquidus viscosity of at least about 200 kilopoise and a Young's modulus of at least about 75 gigapascals.

In certain implementations of this type of information storage device, the root mean square roughness of the at least one major surface of the glass substrate can be less than or equal to 0.5 nanometers, the surface compressive stress of the at least one major surface of the glass substrate is at least about 300 megapascals, the depth of the surface compressive layer of the at least one major surface of the glass substrate is at least about 40 micrometers, and the Young's modulus of the glass composition is at least about 80 gigapascals.

These and other aspects, advantages, and salient features of the present disclosure will become apparent from the following detailed description and the appended claims.

DETAILED DESCRIPTION

Referring now to the figures, wherein like reference numerals represent like parts throughout the several views, exemplary embodiments will be described in detail. Throughout this description, various components may be identified having specific values or parameters. These items, however, are provided as being exemplary of the present disclosure. Indeed, the exemplary embodiments do not limit the various aspects and concepts, as many comparable parameters, sizes, ranges, and/or values may be implemented. Similarly, the terms "first," "second," "primary," "secondary," "top," "bottom," "distal," "proximal," and the like, do not denote any order, quantity, or importance, but rather are used to distinguish one element from another. Further, the terms "a," "an," and "the" do not denote a limitation of quantity, but rather denote the presence of "at least one" of the referenced item.

The glass compositions described herein generally have high elastic moduli, high liquidus viscosities, and are capable of being chemically strengthened by ion exchange. The high elastic modulus, which is intrinsic to the glass composition, can provide the desired high stiffness, which is an extrinsic property, to the ultimate glass article that is produced therefrom. For clarity, unless the specific type of elastic modulus measurement is explicitly indicated, the elastic modulus described herein will be the Young's modulus of a material, rather than, for example, shear modulus, bulk modulus, Poisson's ratio, and the like. The high liquidus viscosity enables the glass compositions to be formed into glass articles via down-draw techniques (e.g., fusion draw, slot draw, and other like methods), which can provide high precision surface smoothness. As used herein, the term "liquidus viscosity" refers to the viscosity of a molten glass at the liquidus temperature, wherein the term "liquidus temperature" refers to the temperature at which crystals first appear as a molten glass cools down from the melting temperature (or the temperature at which the very last crystals melt away as temperature is increased from room temperature).

In general, the glass compositions described herein exhibit a Young's modulus of at least about 70 gigapascals (GPa) and a liquidus viscosity of at least 100 kilopoise (kPoise). As will be described in more detail below, in scenarios where greater stiffness is desired in the final glass article, the glass compositions can exhibit a Young's modulus of at least about 80 GPa. Similarly, in scenarios where a higher liquidus viscosity is desired for down-draw processability, the glass compositions can exhibit a liquidus viscosity of at least about 200 kPoise. As will now be described, the glass composition can be tailored to provide the desired Young's modulus and/or liquidus viscosity to provide the desired features for fabrication of an information storage device substrate.

The glass compositions described herein generally include $SiO_2$, $Al_2O_3$, $Li_2O$, $Na_2O$, and a divalent metal oxide represented by "MO" where M can be Mg, Ca, or Zn. In addition, the glass compositions can include any of a variety of optional components including $K_2O$, $B_2O_3$, $ZrO_2$, $TiO_2$, $HfO_2$, $Nb_2O_5$, $Ta_2O_5$, $La_2O_3$, $Y_2O_3$, or a fining agent.

The largest single constituent of the glass compositions is $SiO_2$, which serves as the primary glass-forming oxide. $SiO_2$ also serves as a viscosity enhancer that aids in formability of and imparts chemical durability to the glass articles. Thus, a suitable range of $SiO_2$ is necessary to control viscosity, liquidus temperature, and/or compatibility with the isopipe material (i.e., in scenarios where a fusion draw process is the down-draw process used to form the glass articles). In addition, the concentration of $SiO_2$ should be sufficiently high to provide the glass articles with suitable chemical durability for any potential acid etching step that may be needed in the fabrication of the information storage device substrates. On the other hand, the 200-poise temperature (viscosity at which glasses are typically melted) of pure $SiO_2$ or high-$SiO_2$ glasses is too high, and defects, such as blisters, may appear. Considering all of these factors, the appropriate range of $SiO_2$ concentration in the glass compositions is greater than or equal to about 55 mole percent (mol %) and less than or equal to about 82 mol %. At higher concentrations, $SiO_2$ raises the melting temperature prohibitively, whereas glass durability suffers at concentrations below the range. In addition, lower $SiO_2$ concentrations can cause the liquidus temperature to increase substantially in glasses having high $K_2O$ or high MgO concentrations.

Like $SiO_2$, $Al_2O_3$ also serves as a glass network former. $Al_2O_3$ also increases the viscosity of the melted glass composition due to its primarily tetrahedral coordination. An increase in $Al_2O_3$ relative to the alkali or alkaline earth oxides generally results in improved chemical durability. $Al_2O_3$ plays an important role in ion-exchangeable glasses because it enables a strong network backbone (i.e., high annealing point or strain point) while enabling the fast diffusivity of alkali ions. As a result, the presence of $Al_2O_3$ hastens the kinetics of the ion-exchange process while promoting a high surface compressive stress. A suitable level of $Al_2O_3$ is also necessary to elevate the liquidus viscosity to levels suitable for manufacture via down-draw processes. It is therefore desirable to keep the $Al_2O_3$ concentration greater than or equal to about 3 mol % and less than or equal to about 30 mol %. At $Al_2O_3$ concentrations that are higher than this range, the viscosity can become prohibitively high, and the liquidus temperature may become too high to sustain a continuous down-draw process.

Alkali oxides (e.g., $Li_2O$, $Na_2O$, and $K_2O$) serve as aids in achieving low melting temperatures and low liquidus temperatures. As used herein, the term "melting temperature" refers to the temperature corresponding to a glass viscosity of 200 poise. Compared to the other oxides, addition of alkali oxides dramatically increases the coefficient of thermal expansion (CTE), a requirement for information storage device substrate materials. The substitution of $K_2O$ for $Na_2O$ increases the CTE, whereas substitution of $Li_2O$ for $Na_2O$ decreases the CTE. Thus, a smaller alkali ion causes a smaller increase of CTE. Furthermore, to perform an ion exchange strengthening process, the presence of a small alkali oxide, such as $Li_2O$ or $Na_2O$, is required to exchange with larger alkali ions in a salt bath. Three types of ion exchange generally can be carried out. $Na^+$-for-$Li^+$ exchange results in a deep depth of layer but low compressive stress. K⁺-for-Li⁺ exchange results in a small depth of layer but a relatively large compressive stress. Finally, K⁺-for-Na⁺ exchange results in intermediate depth of layer and compressive stress. The glasses disclosed herein include Li₂O and Na₂O, while K₂O is an optional component.

The presence of Li₂O leads to high values of elastic moduli and specific modulus (i.e., the ratio of Young's modulus to density), which are important properties for information storage device substrates to possess. These glasses generally are ion-exchanged in a salt bath mixture of both KNO₃ and NaNO₃. The resulting K⁺-for-Li⁺ exchange leads to a high surface compressive stress, while the Na⁺-for-Li⁺ exchange simultaneously provides for a deep depth of layer. Any K⁺-for-Na⁺ exchange supplements both the surface compressive stress and depth of layer.

The presence of a small amount of K₂O generally improves diffusivity and hence leads to a larger depth of layer. K₂O is also particularly useful in lowering the liquidus temperature of the glass, and hence leading to a higher liquidus viscosity. Of the three alkali oxides, however, K₂O provides the least benefit to specific modulus. To balance the effects of CTE, ion-exchangeability, elastic and specific moduli, and liquidus viscosity, the total alkali content in the glass compositions disclosed herein is greater than or equal to about 10 mol %. In certain scenarios, the Li₂O content will be greater than or equal to about 5 mol %.

Other oxide components such as B₂O₃ and divalent metal oxides (MO, such as MgO, CaO, or ZnO) are also useful for lowering the liquidus temperature of the glass and obtaining a high liquidus viscosity. These oxides, however, also act to slow the alkali diffusivity and hence lower the depth of layer after ion exchange strengthening. This effect is minimized with MgO and ZnO, which also act to limit stress relaxation and thereby enhance the surface compressive stress of the glass after ion exchange. CaO also enhances surface compressive stress and liquidus viscosity but leads to a greater reduction in depth of layer. Of these oxides, B₂O₃ is the most effective flux (i.e., a component added to reduce melting temperature) and lowers both density and CTE. Unfortunately, it also has the greatest deleterious effect with respect to elastic and specific moduli and ion exchange properties. Thus, the inclusion of B₂O₃ in the glass compositions disclosed herein is optional, and, if present, is limited to less than or equal to about 5 mol %. In addition, the total divalent metal oxide content in the glass compositions disclosed herein is greater than or equal to about 0.5 mol % and less than or equal to about 8 mol %.

In addition to the oxides described above, other oxides may be added to increase elastic moduli and specific moduli. These include ZrO₂, TiO₂, HfO₂, Nb₂O₅, Ta₂O₅, La₂O₃, and Y₂O₃. Although these oxides serve to increase the elastic moduli and specific moduli, Nb₂O₅, Ta₂O₅, La₂O₃, and Y₂O₃ tend to have a deleterious effect on alkali diffusivity. Moreover, too high concentrations of these oxides can lead to melting defects or phase separation. Thus, the inclusion of these oxides in the glass compositions disclosed herein is optional. If present, these oxides can be present in an amount that is less than or equal to about 5 mol %.

In addition to the elements described above, other elements and compounds can be added to eliminate or reduce defects within the glass. The glass compositions disclosed herein tend to exhibit melting temperatures that are relatively high (i.e., at least about 1200 degrees Celsius (° C.)). Such temperatures are typical of industrial melting processes, and in some cases melting at such temperatures may be required to obtain glass with low levels of gaseous inclusions. To aid in eliminating gaseous inclusions, it may be useful to add chemical fining agents. Such fining agents fill early-stage bubbles with gas, thus increasing their rise velocity through the melt. These optional fining agents can include $SnO_2$, $Fe_2O_3$, NaCl, $As_2O_3$, and $Sb_2O_3$, among others. The concentration of fining agents, when implemented, in the glass compositions disclosed herein is less than or equal to about 0.5 mol %.

Once the appropriate glass composition is chosen, it can be fabricated into a glass article. As stated above, the glass compositions described herein are down-drawable. That is the glass compositions are capable of being formed into sheets using down-draw methods such as, but not limited to, fusion draw and slot draw methods that are known to those skilled in the glass fabrication arts. Such down-draw processes are used in the large-scale manufacture of ion-exchangeable flat glass articles.

By way of explanation, the fusion draw process uses a drawing tank that has a channel for accepting molten glass raw material. The channel has weirs that are open at the top along the length of the channel on both sides of the channel. When the channel fills with molten material, the molten glass overflows the weirs. The molten glass flows gravitationally down the outside surfaces of the drawing tank. These outside surfaces extend down and inwardly so that they join at an edge below the drawing tank. The two flowing glass surfaces join at this edge to fuse and form a single flowing sheet. The fusion draw method offers the advantage that, since the two glass films flowing over the channel fuse together, neither outside surface of the resulting glass sheet comes into contact with any part of the apparatus. Thus, the surface properties are not affected by such contact, and glass articles with pristine surfaces can be fabricated.

The slot draw method is distinct from the fusion draw method. Here the molten raw material glass is provided to a drawing tank. The bottom of the drawing tank has an open slot with a nozzle that extends the length of the slot. The molten glass flows through the slot/nozzle and is drawn downward as a continuous sheet therethrough and into an annealing region. Compared to the fusion draw process, the slot draw process provides a thinner sheet, as only a single sheet is drawn through the slot, rather than two sheets being fused together, as in the fusion down-draw process. Given that both outside surfaces of the single sheet come into contact with the apparatus, the surface properties of the drawn glass sheet can be affected by the slot. Nevertheless, it is also possible to produce glass articles with pristine surfaces using slot draw methods.

Once a glass article has been formed by a down-draw method, it can be subjected to chemical strengthening by ion exchange. As used herein, the term "ion-exchange" is understood to mean that the glass is strengthened by ion exchange processes that are known to those skilled in the glass fabrication arts. By way of explanation, such ion exchange processes involve, for example, treating a heated glass article with a heated solution of an alkali metal salt containing ions having a larger ionic radius than ions that are present in the glass surface, thus replacing the smaller ions with the larger ions. The replacement of smaller ions by larger ions at a temperature below that at which the glass network can relax produces a distribution of ions across the surface of the glass that results in a stress profile. The larger volume of the incoming ion produces compressive stress on the surface and tension in the center of the glass. The compressive stress (CS) is related to the central tension (CT) by the following relationship:

$$CS = CT*(t - 2DOL)/DOL$$

where t is the thickness of the glass and DOL is the depth of the ion exchanged layer. In this formula, the stress profile is assumed to be triangular. As described above, three types of ion exchange generally can be carried out with respect to the glass articles formed by the compositions disclosed herein: Na⁺-for-Li⁺ exchange, K⁺-for-Li⁺ exchange, and K⁺-for-Na⁺ exchange. Thus, the salt solution used for such an ion exchange process can include a potassium-containing salt, a sodium-containing salt, or both.

As stated above, down-draw processes produce surfaces that are relatively pristine. Given that the strength of the glass surface is controlled by the amount and size of surface flaws, a pristine surface that has had minimal contact has a higher initial strength. When this high strength glass is then chemically strengthened by ion exchange, the resultant strength is higher than that of a surface that has been lapped and polished. Chemical strengthening by ion exchange also increases the resistance of the glass to flaw formation due to handling. Thus, strengthened glass articles having high surface smoothness can be produced.

Specifically, the glass articles described herein generally have surface compressive stresses of at least about 200 megapascals (MPa). In certain implementations, the glass articles can have CS values of at least about 450 MPa. In addition, the CS layers generally have a depth of at least about 30 micrometers ($\mu m$). In certain implementations, the DOL can be at least about 40 $\mu m$.

In addition to these ion-exchange-induced features, the as-drawn glass articles generally have at least one major surface with a root-mean-square (RMS) measured surface roughness of less than 2 nm. In certain implementations, the as-drawn glass articles generally can have at least one major surface with a RMS surface roughness of less than 0.5 nm.

Once the glass articles have been chemically strengthened by ion exchange, they can be employed as substrates in the construction of information storage devices. The fabrication of such devices varies by device, but is well known to those skilled in the art to which this disclosure pertains.

In a specific embodiment that might be particularly advantageous for applications such as information storage devices, a substrate is formed from an ion exchanged, fusion drawn glass sheet. The glass sheet is formed from a glass composition that includes:
$SiO_2 \geq 55$ mol %
$Al_2O_3 \geq 3$ mol %
$Li_2O \geq 5$ mol %
60 mol % $\leq SiO_2+Al_2O_3 \leq 85$ mol %
$Na_2O+K_2O+Li_2O \geq 10$ mol %
0.5 mol % $\leq MgO+CaO+ZnO \leq 8$ mol %
0 mol % $\leq ZrO_2+TiO_2+HfO_2+Nb_2O_5+Ta_2O_5+La_2O_3+Y_2O_3 \leq 5$ mol %
and has a liquidus viscosity of greater than or equal to about 200 kPoise. In certain implementations, the glass composition exhibits at least one of the following properties:
MgO≥CaO,
$Li_2O/Na_2O \geq 0.7904$,
at least substantially free of $ZrO_2$,
at least substantially free of $TiO_2$,
no $As_2O_3$ as a fining agent,
no $Sb_2O_3$ as a fining agent,
a density of less than or equal to 2.55 grams per cubic centimeter ($g/cm^3$),
a Young's modulus of greater than 75 GPa, or
a specific modulus of at least 30.5 $GPa*cm^3/g$.

As used herein, the term "at least substantially free" means that the described component is not intentionally added to the glass or glass raw materials during any of the processing steps leading to the formation of the glass article. It is understood that a glass composition or glass article that is at least substantially free of a component may inadvertently contain small amounts of that component due to contamination or may contain no amounts of that component.

The glass composition can be fusion drawn into sheets having a thickness of less than or equal to about 2 millimeters (mm) and a RMS surface roughness of less than 0.5 nm on both major surfaces thereof. Once the glass composition is fusion drawn, it can be ion exchanged. The ion exchange can result in a CS layer having a DOL of at least about 30 $\mu m$ and a CS of at least 300 MPa. In certain exemplary implementations, ion exchanging the glass composition can result in a CS layer having a DOL of at least about 45 $\mu m$ and a CS of at least 400 MPa. The substrate for the information storage device can be formed from the ion exchanged glass article.

In another specific embodiment, an information storage device substrate is formed from an ion exchanged, fusion drawn glass sheet. The glass sheet is formed from a glass composition that includes:
$SiO_2 \geq 60$ mol %
$Al_2O_3 \geq 6$ mol %
$Li_2O \geq 5$ mol %
$SiO_2+Al_2O_3 \leq 85$ mol %
$Na_2O+K_2O+Li_2O \geq 13.5$ mol %
0.5 mol % $\leq MgO+CaO+ZnO \leq 8$ mol %
0 mol % $\leq ZrO_2+TiO_2+HfO_2+Nb_2O_5+Ta_2O_5+La_2O_3+Y_2O_3 \leq 5$ mol %
and has a liquidus viscosity of greater than or equal to about 200 kPoise. In certain implementations, the glass composition exhibits at least one of the following properties:
MgO≥CaO,
$Li_2O/Na_2O \geq 0.7904$,
at least substantially free of $ZrO_2$,
at least substantially free of $TiO_2$,
no $As_2O_3$ as a fining agent,
no $Sb_2O_3$ as a fining agent,
a density of less than or equal to 2.50 grams per cubic centimeter ($g/cm^3$),
a Young's modulus of greater than 80 GPa, or
a specific modulus of at least 32 $GPa*cm^3/g$.

The glass composition can be fusion drawn into sheets having a thickness of less than or equal to about 2 millimeters (mm) and a RMS surface roughness of less than 0.5 nm on both major surfaces thereof. Once the glass composition is fusion drawn, it can be ion exchanged. The ion exchange can result in a CS layer having a DOL of at least about 30 $\mu m$ and a CS of at least 300 MPa. In certain exemplary implementations, ion exchanging the glass composition can result in a CS layer having a DOL of at least about 45 $\mu m$ and a CS of at least 400 MPa. The substrate for the information storage device can be formed from the ion exchanged glass article.

The various embodiments of the present disclosure are further illustrated by the following non-limiting examples.

EXAMPLES

Example 1

Fabrication and Characterization of Glass Articles

In this example, various glass samples were fabricated and characterized. The compositions and properties of the glass articles are listed in Tables I and II.

To fabricate the glass samples, raw materials were mixed by vigorously shaking or stirring the materials together. If soft agglomerates were present, a more aggressive mixing method such as ball-milling may have been appropriate. The well-mixed batch was transferred into a 1800 $cm^3$ platinum crucible contained within a refractory backer, and the crucible containing the batch and the backer were loaded into a furnace, heated, and held at temperature for an appropriate time. After this time, the crucible was removed from the furnace and the glass was poured into a free-forming patty of glass on a cold steel plate, and then transferred to an annealing oven for an annealing step. Afterwards, the glass was removed and subjected to various characterization steps.

TABLE I

| | Sample Number | | | | | | | | | |
|---|---|---|---|---|---|---|---|---|---|---|
| | 1 | 2 | 3 | 4 | 5 | 6 | 7 | 8 | 9 | 10 |
| Composition (mol %) | | | | | | | | | | |
| $SiO_2$ | 67.01 | 66.27 | 66.33 | 65.31 | 65.28 | 66.15 | 65.52 | 64.53 | 63.51 | 62.63 |
| $Al_2O_3$ | 10.14 | 8.09 | 8.09 | 6.98 | 6.96 | 10.98 | 5.11 | 6.46 | 7.71 | 9.04 |
| $Li_2O$ | 6.30 | 11.73 | 10.66 | 9.65 | 9.67 | 7.76 | 12.67 | 11.95 | 11.23 | 10.52 |
| $Na_2O$ | 11.32 | 9.98 | 9.97 | 10.48 | 10.49 | 11.93 | 12.40 | 12.78 | 13.29 | 13.59 |
| $K_2O$ | 0.27 | 0.01 | 0.01 | 1.49 | 2.48 | 0.27 | 0.27 | 0.27 | 0.27 | 0.26 |
| MgO | 2.15 | 0.03 | 0.04 | 0.51 | 0.03 | 1.03 | 1.05 | 1.05 | 1.04 | 1.03 |
| CaO | 1.80 | 1.05 | 2.08 | 2.59 | 2.07 | 1.78 | 1.85 | 1.83 | 1.84 | 1.80 |
| $SnO_2$ | | | | | | 0.10 | 0.10 | 0.10 | 0.10 | 0.10 |
| $ZrO_2$ | 1.02 | 2.82 | 2.81 | 2.98 | 3.01 | | 1.02 | 1.02 | 1.00 | 1.02 |
| $TiO_2$ | | 0.01 | 0.01 | 0.01 | 0.01 | | | | | |
| $Fe_2O_3$ | 0.01 | 0.01 | 0.01 | 0.01 | 0.01 | 0.01 | 0.01 | 0.01 | 0.01 | 0.01 |
| $B_2O_3$ | | | | | | | | | | |
| Total | 100.0 | 100.0 | 100.0 | 100.0 | 100.0 | 100.0 | 100.0 | 100.0 | 100.0 | 100.0 |
| Li/Na | 0.557 | 1.176 | 1.068 | 0.920 | 0.921 | 0.651 | 1.022 | 0.934 | 0.845 | 0.775 |
| $R_2O-Al_2O_3$ | 7.75 | 13.64 | 12.55 | 14.64 | 15.69 | 8.98 | 20.23 | 18.54 | 17.08 | 15.34 |
| Properties | | | | | | | | | | |
| FE Strain Pt (C.) | 491 | 464 | 471 | 458 | 453 | | | | | |
| FE Anneal Pt (C.) | 532 | 503 | 509 | 495 | 489 | | | | | |
| FE Softening Pt (C.) | 745.3 | 691.6 | 698.3 | 679.5 | 674.2 | | | | | |
| CTE ($\times 10^{-7}$/C.) | 83.3 | 86.7 | 84.9 | 92.5 | 84.2 | 89.7 | 105.9 | 104.8 | 103.5 | 103.3 |
| Density (g/cm³) | 2.474 | 2.51 | 2.519 | 2.539 | 2.537 | 2.38 | 2.485 | 2.49 | 2.495 | 2.499 |
| Poisson's Ratio | 0.222 | 0.218 | 0.225 | 0.243 | 0.237 | 0.22 | 0.234 | 0.234 | 0.226 | 0.229 |
| Shear Modulus (GPa) | 33.00 | 34.41 | 34.38 | 34.14 | 33.80 | 32.92 | 33.00 | 33.09 | 33.30 | 33.46 |
| Young's Modulus (GPa) | 80.64 | 83.79 | 84.26 | 84.87 | 83.61 | 80.34 | 81.44 | 81.66 | 81.64 | 82.26 |
| Specific Modulus E/density (GPa * cc/g) | 32.60 | 33.38 | 33.45 | 33.43 | 32.96 | 33.76 | 32.77 | 32.80 | 32.72 | 32.92 |
| Liquidus Viscosity (kPoise) | 224 | 248 | 214 | 755 | 2280 | 187 | 162 | | | |
| 200-Poise Temperature (C.) | 1545.0 | 1370.1 | 1379.1 | 1346.6 | 1339.7 | 1489 | 1228 | | | |

| | Sample Number | | | | | | | | | |
|---|---|---|---|---|---|---|---|---|---|---|
| | 11 | 12* | 13 | 14 | 15 | 16 | 17 | 18 | 19 | 20 |
| Composition (mol %) | | | | | | | | | | |
| $SiO_2$ | 68.95 | 66 | 66.00 | 66.12 | 68.85 | 68.81 | 68.91 | 66.92 | 66.84 | 68.71 |
| $Al_2O_3$ | 9.97 | 10 | 9.96 | 9.98 | 9.96 | 9.94 | 9.95 | 9.95 | 9.95 | 9.95 |
| $Li_2O$ | 7.96 | 5 | 5.00 | 4.99 | 7.98 | 9.94 | 6.99 | 7.94 | 6.98 | 7.86 |
| $Na_2O$ | 4.94 | 8 | 7.90 | 7.90 | 4.96 | 2.98 | 3.95 | 4.95 | 3.95 | 3.93 |
| $K_2O$ | 0.99 | 1 | 0.99 | 0.99 | 0.99 | 1.01 | 2.94 | 0.99 | 2.95 | 2.95 |
| MgO | 3.57 | 3.5 | 3.59 | 3.50 | 5.10 | 2.04 | 5.10 | 5.09 | 5.16 | 5.44 |
| CaO | 1.54 | 1.5 | 1.53 | 1.52 | 2.05 | 5.17 | 2.06 | 2.06 | 2.08 | 1.05 |
| $SnO_2$ | 0.09 | 0.1 | 0.10 | 0.09 | 0.10 | 0.10 | 0.10 | 0.10 | 0.10 | 0.10 |
| $ZrO_2$ | 1.99 | 5 | | 2.45 | | | | | | |
| $TiO_2$ | | | 4.92 | 2.45 | | | | 1.98 | 1.99 | |
| $Fe_2O_3$ | 0.01 | | 0.01 | 0.01 | 0.01 | 0.01 | 0.01 | 0.01 | 0.01 | 0.01 |
| $B_2O_3$ | | | | | | | | | | |
| Total | 100.0 | 100 | 100.0 | 100.0 | 100.0 | 100.0 | 100.0 | 100.0 | 100.0 | 100.0 |
| Li/Na | 1.611 | 0.625 | 0.633 | 0.631 | 1.610 | 3.336 | 1.769 | 1.604 | 1.766 | 2.000 |
| $R_2O-Al_2O_3$ | 3.92 | 4 | 3.92 | 3.89 | 3.97 | 3.99 | 3.93 | 3.94 | 3.92 | 4.80 |
| Properties | | | | | | | | | | |
| FE Strain Pt (C.) | 548 | | 541 | 549 | 513 | 500 | 516 | 523 | 525 | 506 |
| FE Anneal Pt (C.) | 596 | | 581 | 593 | 558 | 544 | 562 | 564 | 567 | 551 |
| FE Softening Pt (C.) | 826.7 | | 805.4 | 812.2 | | | 791.4 | | 777.2 | 782.4 |
| CTE ($\times 10^{-7}$/C.) | 65.1 | | 74.5 | 69.4 | 67.4 | 66.1 | 70.7 | 68.6 | 71.2 | 71.1 |
| Density (g/cm³) | 2.478 | | 2.493 | 2.531 | 2.434 | 2.445 | 2.434 | 2.465 | 2.463 | 2.426 |
| Poisson's Ratio | 0.217 | | 0.212 | 0.218 | 0.214 | 0.216 | 0.218 | 0.214 | 0.222 | 0.222 |
| Shear Modulus (GPa) | 34.71 | | 33.85 | 34.20 | 34.02 | 34.39 | 33.29 | 34.49 | 33.63 | 33.24 |

TABLE I-continued

| | | | | | | | | | |
|---|---|---|---|---|---|---|---|---|---|
| Young's Modulus (GPa) | 84.45 | 82.03 | 83.33 | 82.62 | 83.61 | 81.09 | 83.77 | 82.20 | 81.23 |
| Specific Modulus E/density (GPa * cc/g) | 34.08 | 32.91 | 32.92 | 33.94 | 34.20 | 33.32 | 33.98 | 33.37 | 33.48 |
| Liquidus Viscosity (kPoise) | | 50 | | 71 | 13 | | | | |
| 200-Poise Temperature (C.) | | | 1540 | | | | | | |

| | Sample Number | | | | | | | | | |
|---|---|---|---|---|---|---|---|---|---|---|
| | 21 | 22 | 23 | 24 | 25 | 26 | 27 | 28 | 29 | 30 |
| Composition (mol %) | | | | | | | | | | |
| $SiO_2$ | 68.63 | 67.85 | 67.70 | 67.24 | 67.05 | 66.54 | 65.01 | 67.14 | 66.58 | 65.94 |
| $Al_2O_3$ | 8.94 | 9.95 | 8.78 | 8.63 | 8.46 | 8.32 | 7.95 | 8.18 | 7.77 | 7.40 |
| $Li_2O$ | 7.82 | 7.82 | 8.78 | 9.83 | 10.69 | 11.72 | 12.09 | 8.47 | 8.87 | 9.27 |
| $Na_2O$ | 4.93 | 3.97 | 10.89 | 10.68 | 10.46 | 10.33 | 9.87 | 10.76 | 10.60 | 10.55 |
| $K_2O$ | 0.99 | 2.97 | 0.21 | 0.17 | 0.11 | 0.06 | 0.27 | 1.19 | 1.63 | 2.08 |
| MgO | 6.48 | 6.29 | 0.83 | 0.64 | 0.41 | 0.21 | 1.04 | 1.02 | 1.04 | 1.02 |
| CaO | 2.10 | 1.05 | 1.45 | 1.08 | 0.72 | 0.35 | 1.79 | 1.46 | 1.31 | 1.15 |
| $SnO_2$ | 0.10 | 0.10 | | | | | | | | 0.00 |
| $ZrO_2$ | | | 1.35 | 1.72 | 2.08 | 2.46 | 1.97 | 1.77 | 2.18 | 2.56 |
| $TiO_2$ | | | | | | | | 0.01 | 0.01 | 0.01 |
| $Fe_2O_3$ | 0.01 | 0.01 | 0.01 | 0.01 | 0.01 | 0.01 | 0.01 | 0.01 | 0.01 | 0.01 |
| $B_2O_3$ | | | | | | | | | | 0.00 |
| Total | 100.0 | 100.0 | 100.0 | 100.0 | 100.0 | 100.0 | 100.0 | 100.0 | 100.0 | 100.0 |
| Li/Na | 1.585 | 1.970 | 0.806 | 0.920 | 1.022 | 1.134 | 1.225 | 0.788 | 0.837 | 0.879 |
| $R_2O$—$Al_2O_3$ | 4.80 | 4.81 | 11.11 | 12.05 | 12.80 | 13.79 | 14.27 | 12.24 | 13.33 | 14.51 |
| Properties | | | | | | | | | | |
| FE Strain Pt (C.) | 505 | 508 | | | | | | | | |
| FE Anneal Pt (C.) | 549 | 552 | | | | | | | | |
| FE Softening Pt (C.) | | | | | | | | | | |
| CTE ($\times 10^{-7}$/C.) | 68 | 71.7 | 87.6 | 88.2 | 89.7 | 89.3 | 92.5 | 93.6 | 94 | 96.1 |
| Density (g/cm$^3$) | 2.436 | 2.433 | 2.475 | 2.482 | 2.489 | 2.496 | 2.502 | 2.491 | 2.505 | 2.517 |
| Poisson's Ratio | 0.222 | 0.228 | 0.224 | 0.231 | 0.236 | 0.218 | 0.223 | 0.2 | 0.211 | 0.22 |
| Shear Modulus (GPa) | 33.93 | 33.27 | 32.57 | 33.52 | 33.75 | 34.11 | 34.40 | 33.46 | 33.68 | 33.58 |
| Young's Modulus (GPa) | 82.90 | 81.69 | 79.73 | 82.56 | 83.45 | 83.11 | 84.16 | 80.30 | 81.56 | 81.96 |
| Specific Modulus E/density (GPa * cc/g) | 34.03 | 33.58 | 32.21 | 33.26 | 33.53 | 33.30 | 33.64 | 32.24 | 32.56 | 32.56 |
| Liquidus Viscosity (kPoise) | | | 171 | 220 | 335 | 361 | 266 | 384 | 214 | 1430 |
| 200-Poise Temperature (C.) | | | 1437 | 1416 | 1398 | 1381 | 1328 | 1404 | 1396 | 1378 |

| | Sample Number | | | | | | | | | |
|---|---|---|---|---|---|---|---|---|---|---|
| | 31 | 32 | 33 | 34 | 35 | 36 | 37 | 38 | 39 | 40 |
| Composition (mol %) | | | | | | | | | | |
| $SiO_2$ | 65.95 | 65.18 | 67.00 | 67.13 | 68.09 | 68.08 | 65.01 | 64.58 | 65.20 | 65.18 |
| $Al_2O_3$ | 8.20 | 7.83 | 9.45 | 9.46 | 10.05 | 10.06 | 7.26 | 7.64 | 6.98 | 6.97 |
| $Li_2O$ | 8.36 | 8.54 | 5.91 | 5.87 | 7.86 | 8.78 | 10.73 | 11.72 | 9.80 | 9.81 |
| $Na_2O$ | 10.06 | 9.42 | 11.37 | 12.38 | 9.85 | 8.87 | 9.42 | 8.46 | 10.41 | 10.42 |
| $K_2O$ | 0.93 | 1.24 | 0.27 | 0.26 | 0.25 | 0.25 | 2.48 | 2.50 | 2.50 | 2.51 |
| MgO | 1.40 | 1.58 | 3.13 | 2.04 | 1.01 | 1.03 | 0.03 | 0.03 | 0.03 | 0.03 |
| CaO | 1.04 | 0.69 | 1.78 | 1.77 | 1.78 | 1.81 | 2.06 | 2.06 | 2.07 | 2.07 |
| $SnO_2$ | | | 0.10 | 0.10 | 0.10 | 0.09 | | | | |
| $ZrO_2$ | 1.38 | 1.58 | 0.98 | 0.98 | 0.99 | 0.99 | 2.99 | 2.99 | 1.51 | |
| $TiO_2$ | 0.01 | 0.01 | 0.01 | 0.01 | 0.01 | 0.01 | 0.01 | 0.01 | 1.50 | 3.01 |
| $Fe^2O_3$ | 0.01 | 0.01 | 0.01 | 0.01 | 0.02 | 0.03 | 0.01 | 0.01 | 0.01 | 0.01 |
| $B_2O_3$ | 2.66 | 3.92 | | | | | | | | |
| Total | 100.0 | 100.0 | 100.0 | 100.0 | 100.0 | 100.0 | 100.0 | 100.0 | 100.0 | 100.0 |
| Li/Na | 0.831 | 0.907 | 0.520 | 0.474 | 0.798 | 0.990 | 1.139 | 1.387 | 0.941 | 0.941 |
| $R_2O$—$Al_2O_3$ | 11.15 | 11.38 | 8.10 | 9.05 | 7.91 | 7.85 | 15.37 | 15.04 | 15.72 | 15.77 |

TABLE I-continued

| Properties | | | | | | | | | | |
|---|---|---|---|---|---|---|---|---|---|---|
| FE Strain Pt (C.) | | | | | | | | | | |
| FE Anneal Pt (C.) | | | | | | | | | | |
| FE Softening Pt (C.) | | | | | | | | | | |
| CTE (×10⁻⁷/C.) | 87 | 87.4 | | | | | | | | |
| Density (g/cm³) | 2.48 | 2.485 | 2.48 | 2.481 | 2.469 | 2.465 | 2.533 | 2.53 | 2.511 | 2.488 |
| Poisson's Ratio | 0.21 | 0.216 | 0.217 | 0.225 | 0.218 | 0.229 | 0.216 | 0.225 | 0.22 | 0.232 |
| Shear Modulus (GPa) | 33.66 | 33.79 | 33.21 | 32.75 | 33.48 | 33.55 | 33.97 | 33.51 | 33.33 | 32.74 |
| Young's Modulus (GPa) | 81.48 | 82.19 | 80.86 | 80.26 | 81.58 | 82.24 | 82.62 | 82.10 | 81.30 | 80.66 |
| Specific Modulus E/density (GPa * cc/g) | 32.85 | 33.08 | 32.61 | 32.35 | 33.04 | 33.36 | 32.62 | 32.45 | 32.38 | 32.42 |
| Liquidus Viscosity (kPoise) | 938 | 291 | 286 | 442 | 277 | 243 | 1219 | >913 | 488 | 52 |
| 200-Poise Temperature (C.) | 1460 | 1359 | 1502 | 1492 | 1514 | 1495 | 1345 | 1343 | 1322 | 1287 |

| | Sample Number | | | | | | | | | |
|---|---|---|---|---|---|---|---|---|---|---|
| | 41 | 42 | 43 | 44 | 45 | 46 | 47 | 48 | 49 | 50 |
| Composition (mol %) | | | | | | | | | | |
| SiO₂ | 64.25 | 63.48 | 65.01 | 64.73 | 66.93 | 65.93 | 64.94 | 63.87 | 65.53 | 62.62 |
| Al₂O₃ | 6.96 | 6.96 | 7.29 | 7.69 | 9.99 | 10.99 | 11.99 | 7.59 | 7.79 | 6.80 |
| Li₂O | 9.81 | 9.69 | 10.78 | 11.68 | 8.99 | 9.99 | 10.99 | 11.55 | 9.60 | 12.47 |
| Na₂O | 10.42 | 10.39 | 9.39 | 8.41 | 9.99 | 8.99 | 7.99 | 11.05 | 11.40 | 11.22 |
| K₂O | 2.46 | 2.45 | 1.47 | 1.48 | 0.25 | 0.25 | 0.25 | 0.32 | 0.21 | 0.23 |
| MgO | 1.03 | 2.02 | 0.50 | 0.49 | 1.00 | 1.00 | 1.00 | 1.68 | 1.53 | 1.90 |
| CaO | 2.05 | 2.04 | 2.56 | 2.56 | 1.75 | 1.75 | 1.75 | 2.39 | 2.27 | 3.03 |
| SnO₂ | | | | | 0.10 | 0.10 | 0.10 | 0.10 | 0.10 | 0.10 |
| ZrO₂ | 2.99 | 2.96 | 2.99 | 2.95 | 1.00 | 1.00 | 1.00 | 1.46 | 1.57 | 1.64 |
| TiO₂ | 0.01 | 0.01 | 0.01 | 0.01 | | | | | | |
| Fe₂O₃ | 0.01 | 0.01 | 0.01 | 0.01 | | | | | | |
| B₂O₃ | | | | | | | | | | |
| Total | 100.0 | 100.0 | 100.0 | 100.0 | 100.0 | 100.0 | 100.0 | 100.0 | 100.0 | 100.0 |
| Li/Na | 0.942 | 0.932 | 1.147 | 1.390 | 0.900 | 1.111 | 1.375 | 1.046 | 0.842 | 1.111 |
| R₂O—Al₂O₃ | 15.73 | 15.57 | 14.35 | 13.87 | 9.24 | 8.24 | 7.24 | 15.33 | 13.42 | 17.11 |
| Properties | | | | | | | | | | |
| FE Strain Pt (C.) | | | | | | | | | | |
| FE Anneal Pt (C.) | | | | | | | | | | |
| FE Softening Pt (C.) | | | | | | | | | | |
| CTE (×10⁻⁷/C) | | | | | 85.1 | 82.9 | 81.6 | 108.7 | 104.3 | 114.1 |
| Density (g/cm³) | 2.543 | 2.548 | 2.537 | 2.533 | 2.483 | 2.474 | 2.474 | 2.508 | 2.503 | 2.524 |
| Poisson's Ratio | 0.222 | 0.22 | 0.231 | 0.228 | 0.218 | 0.217 | 0.217 | 0.223 | 0.229 | 0.23 |
| Shear Modulus (GPa) | 33.96 | 34.13 | 34.72 | 34.67 | 33.69 | 34.10 | 34.49 | 34.03 | 33.68 | 34.39 |
| Young's Modulus (GPa) | 82.99 | 83.26 | 85.45 | 85.18 | 82.05 | 83.01 | 83.93 | 83.25 | 82.79 | 84.56 |
| Specific Modulus E/density (GPa * cc/g) | 32.64 | 32.68 | 33.68 | 33.63 | 33.05 | 33.55 | 33.92 | 33.19 | 33.07 | 33.50 |
| Liquidus Viscosity (kPoise) | >1122 | >565 | | | | | | | | |
| 200-Poise Temperature (C.) | 1337 | 1322 | | | | | | | | |

| | Sample Number | | | | | | | | | |
|---|---|---|---|---|---|---|---|---|---|---|
| | 51 | 52 | 53 | 54 | 55 | 56 | 57 | 58 | 59 | 60 |
| Composition (mol %) | | | | | | | | | | |
| SiO₂ | 57.04 | 63.74 | 60.94 | 66.06 | 66.05 | 65.00 | 65.69 | 66.49 | 66.45 | 66.38 |
| Al₂O₃ | 6.57 | 4.42 | 4.55 | 8.13 | 8.13 | 7.00 | 6.86 | 10.47 | 10.21 | 9.95 |
| Li₂O | 19.68 | 14.87 | 18.15 | 13.03 | 10.01 | 10.00 | 9.80 | 1.30 | 2.60 | 3.91 |
| Na₂O | 10.70 | 9.61 | 9.37 | 9.97 | 10.01 | 10.50 | 10.29 | 13.00 | 12.67 | 12.33 |
| K₂O | 0.21 | 0.19 | 0.20 | | | 2.50 | 2.45 | 2.24 | 1.99 | 1.74 |
| MgO | 1.69 | 1.94 | 1.94 | | | 1.00 | 0.98 | 5.38 | 4.78 | 4.19 |

TABLE I-continued

| | | | | | | | | | | |
|---|---|---|---|---|---|---|---|---|---|---|
| CaO | 2.74 | 3.40 | 3.36 | | 3.00 | 1.00 | 0.98 | 0.25 | 0.22 | 0.20 |
| $SnO_2$ | 0.10 | 0.10 | 0.10 | | | | | | | 0.00 |
| $ZrO_2$ | 1.27 | 1.72 | 1.38 | 2.81 | 2.81 | 3.00 | 2.94 | 0.28 | 0.56 | 0.84 |
| $TiO_2$ | | | | | | | | 0.59 | 0.52 | 0.46 |
| $Fe_2O_3$ | | | | | | | | | | 0.00 |
| $B_2O_3$ | | | | | | | | | | 0.00 |
| Total | 100.0 | 100.0 | 100.0 | 100.0 | 100.0 | 100.0 | 100.0 | 100.0 | 100.0 | 100.0 |
| Li/Na | 1.839 | 1.548 | 1.936 | 1.307 | 1.000 | 0.952 | 0.952 | 0.100 | 0.205 | 0.317 |
| $R_2O-Al_2O_3$ | 24.02 | 20.24 | 23.17 | 14.87 | 11.89 | 16.00 | 15.69 | 6.07 | 7.04 | 8.03 |
| Properties | | | | | | | | | | |
| FE Strain Pt (C.) | | | | | | | | | | |
| FE Anneal Pt (C.) | | | | | | | | | | |
| FE Softening Pt (C.) | | | | | | | | | | |
| CTE ($\times 10^{-7}$/C.) | 101.7 | 95.1 | 95.9 | 90 | 86.1 | 99.7 | 94.1 | 89 | 90.3 | 88.5 |
| Density (g/cm$^3$) | 2.518 | 2.519 | 2.515 | 2.501 | 2.527 | 2.53 | 2.523 | 2.457 | 2.467 | 2.472 |
| Poisson's Ratio | 0.241 | 0.225 | 0.231 | 0.214 | 0.219 | 0.208 | 0.215 | 0.215 | 0.213 | 0.212 |
| Shear Modulus (GPa) | 35.39 | 34.64 | 35.11 | 34.35 | 34.67 | 33.80 | 33.58 | 30.89 | 31.57 | 32.06 |
| Young's Modulus (GPa) | 87.87 | 84.89 | 86.42 | 83.39 | 84.51 | 81.65 | 81.61 | 75.04 | 76.60 | 77.69 |
| Specific Modulus E/density (GPa * cc/g) | 34.90 | 33.70 | 34.36 | 33.34 | 33.44 | 32.27 | 32.34 | 30.54 | 31.05 | 31.43 |
| Liquidus Viscosity (kPoise) | | | | 404 | 12 | 977 | 1420 | | 1907 | |
| 200-Poise Temperature (C.) | | | | 1368 | 1373 | | | | 1567 | |

| | Sample Number | | |
|---|---|---|---|
| | 61 | 62 | 63 |
| Composition (mol %) | | | |
| $SiO_2$ | 66.34 | 66.28 | 66.25 |
| $Al_2O_3$ | 9.69 | 9.43 | 9.17 |
| $Li_2O$ | 5.21 | 6.51 | 7.81 |
| $Na_2O$ | 11.99 | 11.65 | 11.32 |
| $K_2O$ | 1.49 | 1.25 | 1.00 |
| MgO | 3.59 | 2.99 | 2.39 |
| CaO | 0.17 | 0.14 | 0.11 |
| $SnO_2$ | | | |
| $ZrO_2$ | 1.12 | 1.41 | 1.69 |
| $TiO_2$ | 0.39 | 0.33 | 0.26 |
| $Fe_2O_3$ | | | |
| $B_2O_3$ | | | |
| Total | 100.0 | 100.0 | 100.0 |
| Li/Na | 0.435 | 0.559 | 0.691 |
| $R_2O-Al_2O_3$ | 9.00 | 9.98 | 10.97 |
| Properties | | | |
| FE Strain Pt (C.) | | | |
| FE Anneal Pt (C.) | | | |
| FE Softening Pt (C.) | | | |
| CTE ($\times 10^{-7}$/C.) | 89.7 | 90.6 | 89.7 |
| Density (g/cm$^3$) | 2.477 | 2.487 | 2.485 |
| Poisson's Ratio | 0.215 | 0.214 | 0.213 |
| Shear Modulus (GPa) | 32.50 | 33.02 | 33.35 |
| Young's Modulus (GPa) | 78.99 | 80.15 | 80.88 |
| Specific Modulus E/density (GPa * cc/g) | 31.89 | 32.23 | 32.55 |
| Liquidus Viscosity (kPoise) | | 924 | |
| 200-Poise Temperature (C.) | | 1492 | |

TABLE II

| | Sample Number | | | | | | | | | |
|---|---|---|---|---|---|---|---|---|---|---|
| | 64 | 65 | 66 | 67 | 68 | 69 | 70 | 71 | 72 | 73 |
| Composition (mol %) | | | | | | | | | | |
| $SiO_2$ | 66.49 | 66.60 | 66.58 | 65.66 | 65.04 | 67.11 | 67.18 | 66.96 | 67.17 | 67.20 |
| $Al_2O_3$ | 9.38 | 9.41 | 9.45 | 9.42 | 9.29 | 9.14 | 10.12 | 9.13 | 10.15 | 10.15 |
| $Li_2O$ | 6.37 | 6.34 | 6.28 | 6.34 | 6.22 | 8.10 | 7.66 | 6.28 | 5.24 | 5.23 |
| $Na_2O$ | 11.60 | 11.50 | 11.49 | 11.46 | 11.45 | 11.38 | 10.86 | 13.26 | 13.27 | 13.31 |
| $K_2O$ | 1.23 | 1.23 | 1.23 | 1.20 | 1.22 | 0.26 | 0.27 | 0.26 | 0.26 | 0.27 |
| MgO | 0.04 | 0.03 | 0.04 | 0.98 | 1.93 | 1.17 | 1.08 | 1.29 | 1.12 | 1.75 |
| CaO | 2.51 | 2.55 | 2.54 | 2.47 | 2.43 | 1.82 | 1.82 | 1.80 | 1.78 | 1.09 |
| $SnO_2$ | | | | | | | | | | |
| $ZrO_2$ | 2.37 | 1.15 | 0.00 | 2.44 | 2.40 | 1.02 | 1.01 | 1.01 | 1.01 | 1.00 |
| $TiO_2$ | 0.01 | 1.19 | 2.38 | 0.01 | 0.01 | | | | | |
| $Fe_2O_3$ | 0.01 | 0.01 | 0.01 | 0.01 | 0.01 | 0.01 | 0.01 | 0.01 | 0.01 | 0.01 |
| $B_2O_3$ | | | | | | | | | | |
| Total | 100.0 | 100.0 | 100.0 | 100.0 | 100.0 | 100.0 | 100.0 | 100.0 | 100.0 | 100.0 |
| Li/Na | 0.549 | 0.551 | 0.547 | 0.553 | 0.544 | 0.712 | 0.705 | 0.473 | 0.395 | 0.393 |
| $R_2O$—$Al_2O_3$ | 9.81 | 9.66 | 9.56 | 9.59 | 9.59 | 10.60 | 8.67 | 10.66 | 8.62 | 8.65 |
| Properties | | | | | | | | | | |
| FE Strain Pt (C.) | 490 | | | | | 462 | 477 | 468 | 486 | 488 |
| FE Anneal Pt (C.) | 530 | | | | | 501 | 517 | 507 | 526 | 529 |
| FE Softening Pt (C.) | 736.6 | | | | | 696.1 | 721.5 | 706.8 | 736.2 | 740.9 |
| CTE ($\times 10^{-7}$/C.) | 87.6 | | | | | 87.8 | 84.2 | 89.9 | 86.9 | 87 |
| Density (g/cm$^3$) | 2.519 | 2.497 | 2.548 | 2.527 | 2.533 | 2.474 | 2.471 | 2.479 | 2.477 | 2.473 |
| Poisson's Ratio | 0.217 | 0.22 | 0.223 | 0.225 | 0.219 | 0.222 | 0.207 | 0.214 | 0.22 | 0.214 |
| Shear Modulus (GPa) | 33.40 | 32.97 | 32.50 | 33.59 | 33.83 | 33.17 | 33.30 | 32.55 | 32.34 | 32.12 |
| Young's Modulus (GPa) | 81.29 | 80.42 | 79.52 | 82.26 | 82.50 | 81.06 | 80.40 | 79.06 | 78.91 | 78.57 |
| Specific Modulus E/density (GPa * cc/g) | 32.27 | 32.21 | 31.21 | 32.55 | 32.57 | 32.77 | 32.54 | 31.89 | 31.86 | 31.77 |
| Liquidus Viscosity (kPoise) | 538 | | 150 | | 1192 | 253 | 201 | 242 | 354 | 311 |
| 200-Poise Temperature (C.) | 1462.1 | | 1431 | | 1436 | 1475.4 | 1514.2 | 1489.4 | 1539.7 | 1542.6 |

| | Sample Number | | | | | | | | | |
|---|---|---|---|---|---|---|---|---|---|---|
| | 74 | 75 | 76 | 77 | 78 | 79 | 80 | 81 | 82 | 83 |
| Composition (mol %) | | | | | | | | | | |
| $SiO_2$ | 70.21 | 70.17 | 70.14 | 71.17 | 71.19 | 69.60 | 66.42 | 65.86 | 67.91 | 69.80 |
| $Al_2O_3$ | 8.51 | 8.50 | 8.49 | 7.47 | 6.88 | 7.78 | 9.39 | 9.56 | 8.99 | 8.49 |
| $Li_2O$ | 5.45 | 6.49 | 6.93 | 5.33 | 5.28 | 5.10 | 6.39 | 8.42 | 7.96 | 7.40 |
| $Na_2O$ | 11.30 | 10.32 | 9.82 | 11.49 | 12.09 | 12.90 | 11.57 | 11.70 | 10.94 | 10.36 |
| $K_2O$ | 0.98 | 0.99 | 0.99 | 0.99 | 0.98 | 0.98 | 1.23 | 0.27 | 0.27 | 0.24 |
| MgO | 1.02 | 0.99 | 1.06 | 1.02 | 1.04 | 1.08 | 0.05 | 1.09 | 1.03 | 0.98 |
| CaO | 1.53 | 1.53 | 1.55 | 1.53 | 1.52 | 1.55 | 3.55 | 1.90 | 1.79 | 1.69 |
| $SnO_2$ | | | | | | | | 0.11 | 0.10 | 0.09 |
| $ZrO_2$ | 1.00 | 1.00 | 1.01 | 0.99 | 1.00 | 1.00 | 1.39 | 1.07 | 1.00 | 0.94 |
| $TiO_2$ | 0.01 | 0.01 | 0.01 | 0.01 | 0.01 | 0.01 | 0.01 | 0.01 | 0.01 | 0.01 |
| $Fe_2O_3$ | 0.01 | 0.01 | 0.01 | 0.01 | 0.01 | 0.01 | 0.01 | 0.01 | 0.01 | 0.01 |
| $B_2O_3$ | | | | | | | | | | |
| Total | 100.0 | 100.0 | 100.0 | 100.0 | 100.0 | 100.0 | 100.0 | 100.0 | 100.0 | 100.0 |
| Li/Na | 0.482 | 0.629 | 0.705 | 0.464 | 0.437 | 0.396 | 0.552 | 0.719 | 0.728 | 0.714 |
| $R_2O$—$Al_2O_3$ | 9.22 | 9.30 | 9.25 | 10.33 | 11.46 | 11.20 | 9.79 | 10.83 | 10.17 | 9.51 |
| Properties | | | | | | | | | | |
| FE Strain Pt (C.) | 473 | 469 | 467 | 464 | 457 | 466 | 478 | | | |
| FE Anneal Pt (C.) | 514 | 510 | 508 | 505 | 498 | 507 | 517 | | | |
| FE Softening Pt (C.) | 729.2 | 722.9 | 718.5 | 715.1 | 704.9 | 703.7 | 713.9 | | | |
| CTE ($\times 10^{-7}$/C.) | 84.2 | 83.1 | 82.4 | 84.5 | 85.3 | 90.5 | 90.1 | 90.4 | 86.7 | 86.3 |
| Density (g/cm$^3$) | 2.458 | 2.455 | 2.453 | 2.454 | 2.452 | 2.468 | 2.499 | 2.485 | 2.472 | 2.458 |
| Poisson's Ratio | 0.215 | 0.214 | 0.214 | 0.212 | 0.212 | 0.22 | 0.222 | 0.225 | 0.216 | 0.213 |
| Shear Modulus (GPa) | 32.25 | 32.60 | 32.75 | 32.00 | 31.86 | 31.81 | 33.02 | 33.36 | 33.23 | 33.04 |

TABLE II-continued

| | | | | | | | | | | |
|---|---|---|---|---|---|---|---|---|---|---|
| Young's Modulus (GPa) | 78.35 | 79.12 | 79.49 | 77.56 | 77.23 | 77.63 | 80.68 | 81.70 | 80.80 | 80.14 |
| Specific Modulus E/density (GPa * cc/g) | 31.87 | 32.23 | 32.41 | 31.61 | 31.50 | 31.46 | 32.29 | 32.88 | 32.69 | 32.61 |
| Liquidus Viscosity (kPoise) | 589 | 370 | 522 | 449 | 558 | 276 | 389 | 229 | 154 | 217 |
| 200-Poise Temperature (C.) | 1536.9 | 1533.7 | 1517.1 | 1515.2 | 1507.5 | 1471.0 | 1446.7 | 1423 | 1457 | 1488 |

| | Sample Number | | | | | | | | | |
|---|---|---|---|---|---|---|---|---|---|---|
| | 84 | 85 | 86 | 87 | 88 | 89 | 90 | 91 | 92 | 93 |
| Composition (mol %) | | | | | | | | | | |
| $SiO_2$ | 68.09 | 67.98 | 67.98 | 67.26 | 66.04 | 65.24 | 66.39 | 64.66 | 65.15 | 65.25 |
| $Al_2O_3$ | 10.01 | 10.99 | 9.00 | 9.43 | 9.95 | 10.46 | 8.99 | 10.67 | 11.20 | 10.68 |
| $Li_2O$ | 6.77 | 5.91 | 7.92 | 7.78 | 7.82 | 7.77 | 7.56 | 8.27 | 7.96 | 7.93 |
| $Na_2O$ | 10.96 | 10.94 | 10.96 | 11.39 | 11.96 | 12.37 | 11.94 | 11.71 | 11.22 | 11.18 |
| $K_2O$ | 0.25 | 0.27 | 0.26 | 0.26 | 0.27 | 0.26 | 0.26 | 0.27 | 0.26 | 0.26 |
| MgO | 1.02 | 1.02 | 1.34 | 1.00 | 1.04 | 1.01 | 1.00 | 1.27 | 1.21 | 1.21 |
| CaO | 1.78 | 1.78 | 1.42 | 1.78 | 1.82 | 1.77 | 1.77 | 1.95 | 1.88 | 1.86 |
| $SnO_2$ | 0.10 | 0.10 | 0.10 | 0.10 | 0.10 | 0.10 | 0.10 | 0.10 | 0.10 | 0.10 |
| $ZrO_2$ | 1.00 | 1.00 | 1.00 | 0.99 | 1.00 | 1.00 | 1.99 | 1.06 | 1.00 | 1.50 |
| $TiO_2$ | 0.01 | 0.01 | 0.01 | | | | | 0.01 | 0.01 | 0.01 |
| $Fe_2O_3$ | 0.01 | 0.01 | 0.01 | 0.01 | 0.01 | 0.01 | 0.01 | 0.02 | 0.02 | 0.02 |
| $B_2O_3$ | | | | | | | | | | |
| Total | 100.0 | 100.0 | 100.0 | 100.0 | 100.0 | 100.0 | 100.0 | 100.0 | 100.0 | 100.0 |
| Li/Na | 0.618 | 0.541 | 0.723 | 0.683 | 0.653 | 0.628 | 0.633 | 0.706 | 0.709 | 0.709 |
| $R_2O$—$Al_2O_3$ | 7.98 | 6.13 | 10.15 | 10.00 | 10.10 | 9.95 | 10.77 | 9.58 | 8.25 | 8.68 |
| Properties | | | | | | | | | | |
| FE Strain Pt (C.) | | | | | | | | | | |
| FE Anneal Pt (C.) | | | | | | | | | | |
| FE Softening Pt (C.) | | | | | | | | | | |
| CTE ($\times 10^{-7}$/C.) | 83.8 | 82 | 86.3 | 86.7 | 89.4 | 89.4 | 88.3 | 89.6 | 87.3 | 89.7 |
| Density (g/cm$^3$) | 2.47 | 2.468 | 2.469 | 2.401 | 2.407 | 2.432 | 2.411 | 2.491 | 2.485 | 2.498 |
| Poisson's Ratio | 0.221 | 0.229 | 0.222 | 0.228 | 0.219 | 0.209 | 0.223 | 0.222 | 0.214 | 0.216 |
| Shear Modulus (GPa) | 33.06 | 32.93 | 33.15 | 33.43 | 33.30 | 33.38 | 33.48 | 33.59 | 33.66 | 33.83 |
| Young's Modulus (GPa) | 80.72 | 80.92 | 81.00 | 82.09 | 81.21 | 80.68 | 81.88 | 82.07 | 81.72 | 82.30 |
| Specific Modulus E/density (GPa * cc/g) | 32.68 | 32.79 | 32.81 | 34.19 | 33.74 | 33.18 | 33.96 | 32.95 | 32.88 | 32.94 |
| Liquidus Viscosity (kPoise) | 306 | 305 | 141 | 153 | 324 | 363 | 351 | 350 | 387 | 313 |
| 200-Poise Temperature (C.) | 1507 | 1558 | 1459 | 1443 | 1443 | 1442 | 1426 | 1430 | 1466 | 1448 |

| | Sample Number | | |
|---|---|---|---|
| | 94 | 95 | 96 |
| Composition (mol %) | | | |
| $SiO_2$ | 65.22 | 65.27 | 65.26 |
| $Al_2O_3$ | 9.77 | 10.68 | 11.19 |
| $Li_2O$ | 8.38 | 7.91 | 8.34 |
| $Na_2O$ | 11.88 | 11.20 | 10.73 |
| $K_2O$ | 0.28 | 0.26 | 0.26 |
| MgO | 1.28 | 1.69 | 1.21 |
| CaO | 1.98 | 1.86 | 1.87 |
| $SnO_2$ | 0.10 | 0.10 | 0.10 |
| $ZrO_2$ | 1.08 | 1.01 | 1.01 |
| $TiO_2$ | 0.01 | 0.01 | 0.01 |
| $Fe_2O_3$ | 0.02 | 0.02 | 0.02 |
| $B_2O_3$ | | | |
| Total | 100.0 | 100.0 | 100.0 |
| Li/Na | 0.706 | 0.706 | 0.778 |
| $R_2O$—$Al_2O_3$ | 10.76 | 8.69 | 8.14 |

TABLE II-continued

| Properties | | | |
|---|---|---|---|
| FE Strain Pt (C.) | | | |
| FE Anneal Pt (C.) | | | |
| FE Softening Pt (C.) | | | |
| CTE ($\times 10^{-7}$/C.) | 90.4 | 87.6 | 85.8 |
| Density (g/cm$^3$) | 2.49 | 2.487 | 2.484 |
| Poisson's Ratio | 0.215 | 0.22 | 0.22 |
| Shear Modulus (GPa) | 33.38 | 33.52 | 33.64 |
| Young's Modulus (GPa) | 81.13 | 81.76 | 82.10 |
| Specific Modulus E/density (GPa * cc/g) | 32.58 | 32.88 | 33.05 |
| Liquidus Viscosity (kPoise) | 386 | 404 | 267 |
| 200-Poise Temperature (C.) | 1413 | 1451 | 1465 |

While the embodiments disclosed herein have been set forth for the purpose of illustration, the foregoing description should not be deemed to be a limitation on the scope of the disclosure or the appended claims. Accordingly, various modifications, adaptations, and alternatives may occur to one skilled in the art without departing from the spirit and scope of the present disclosure or the appended claims.

The invention claimed is:

1. A glass composition, comprising:
at least 55 mol % SiO$_2$, Al$_2$O$_3$, less than 10 mol % Li$_2$O, Na$_2$O, and a divalent metal oxide represented by "MO," wherein M is Mg, Ca, or Zn;
wherein the glass composition has a liquidus viscosity of at least about 200 kilopoise and a Young's modulus of at least about 80 gigapascals.

2. The glass composition of claim 1, wherein the glass composition has a density of less than or equal to about 2.55 grams per cubic centimeter.

3. The glass composition of claim 1, wherein the glass composition has a specific modulus of at least 30.5 gigapascals * cubic centimeters per gram.

4. The glass composition of claim 1, wherein:
55 mol %≤SiO$_2$≤82 mol %;
3 mol %≤Al$_2$O$_3$≤30 mol %;
Na$_2$O+K$_2$O+Li$_2$O≥10 mol %;
0 mol %≤B$_2$O$_3$≤5 mol %;
0.5 mol %≤MgO+CaO+ZnO≤8 mol %; and
0 mol %≤ZrO$_2$+TiO$_2$+HfO$_2$+Nb$_2$O$_5$+Ta$_2$O$_5$+La$_2$O$_3$+Y$_2$O$_3$≤5 mol %.

5. The glass composition of claim 4, wherein Li$_2$O≥5 mol %.

6. The glass composition of claim 4, further comprising a fining agent in an amount less than or equal to 0.5 mol %.

7. A glass composition, comprising:
SiO$_2$≥55 mol %;
Al$_2$O$_3$≥3 mol %;
10 mol%>Li$_2$O≥5 mol %;
60 mol %≤SiO$_2$+Al$_2$O$_3$≤85 mol %;
Na$_2$O+K$_2$O+Li$_2$O≥10 mol %;
0.5 mol %≤MgO+CaO+ZnO≤8 mol %; and
0 mol %≤ZrO$_2$+TiO$_2$+HfO$_2$+Nb$_2$O$_5$+Ta$_2$O$_5$+La$_2$O$_3$+Y$_2$O$_3$≤5 mol %;
wherein the glass composition has a liquidus viscosity of at least about 200 kilopoise.

8. The glass composition of claim 7, wherein the glass composition has a Young's modulus of at least about 75 gigapascals.

9. The glass composition of claim 7, wherein a content of MgO is greater than a content of CaO.

10. The glass composition of claim 7, wherein a ratio of Li$_2$O to Na$_2$O is greater than or equal to 0.7904.

11. The glass composition of claim 7, wherein the glass composition is at least substantially free of ZrO$_2$ and/or TiO$_2$.

12. The glass composition of claim 7, wherein the glass composition has a density of less than or equal to 2.55 grams per cubic centimeter.

13. The glass composition of claim 7, wherein the glass composition has a specific modulus of at least 30.5 gigapascals * cubic centimeters per gram.

14. A glass article, formed from a glass composition that comprises:
SiO$_2$≥55 mol %;
Al$_2$O$_3$≥3 mol %;
10 mol %<Li$_2$O≤5 mol %;
60 mol %≤SiO$_2$+Al$_2$O$_3$≤85 mol %;
Na$_2$O+K$_2$O+Li$_2$O≥10 mol %;
0.5 mol %≤MgO+CaO+ZnO≤8 mol %; and
0 mol %≤ZrO$_2$+TiO$_2$+HfO$_2$+Nb$_2$O$_5$+Ta$_2$O$_5$+La$_2$O$_3$+Y$_2$O$_3$≤5 mol %;
wherein the glass composition has a liquidus viscosity of at least about 200 kilopoise.

15. The glass article of claim 14, wherein the glass article has a thickness of less than or equal to about 2 millimeters.

16. The glass article of claim 14, wherein at least one major surface of the glass article has a root mean square roughness of less than or equal to 2 nanometers.

17. The glass article of claim 14, wherein at least one major surface of the glass article has a surface compressive stress of at least about 200 megapascals and a surface compressive layer having a depth of at least about 30 micrometers.

18. The glass article of claim 14, wherein the glass composition has a Young's modulus of at least about 75 gigapascals.

19. An information storage device, comprising:
a glass substrate having a thickness of less than or equal to about 2 millimeters, and having at least one major surface having a root mean square roughness of less than or equal to 2 nanometers, a surface compressive stress of at least about 200 megapascals, and a surface compressive layer having a depth of at least about 30 micrometers, wherein the glass substrate is formed from a glass composition that comprises:

$SiO_2 \geq 55$ mol %;
$Al_2O_3 \geq 3$ mol %;
10 mol % > $Li_2O \geq 5$ mol %;
60 mol % $\leq SiO_2 + Al_2O_3 \leq 85$ mol %;
$Na_2O + K_2O + Li_2O \geq 10$ mol %;
0.5 mol % $\leq MgO + CaO + ZnO \leq 8$ mol %; and
0 mol % $\leq ZrO_2 + TiO_2 + HfO_2 + Nb_2O_5 + Ta_2O_5 + La_2O_3 + Y_2O_3 \leq 5$ mol %;
wherein the glass composition has a liquidus viscosity of at least about 200 kilopoise and a Young's modulus of at least about 75 gigapascals.

20. The information storage device of claim 19, wherein:
the root mean square roughness of the at least one major surface of the glass substrate is less than or equal to 0.5 nanometers;
the surface compressive stress of the at least one major surface of the glass substrate is at least about 300 megapascals;
the depth of the surface compressive layer of the at least one major surface of the glass substrate is at least about 40 micrometers; and
the Young's modulus of the glass composition is at least about 80 gigapascals.

* * * * *